June 24, 1952  D. H. ELLIS  2,601,377
REVERSIBLE THERMOSTATIC CONTROL DEVICE
Filed Oct. 13, 1948  2 SHEETS—SHEET 1
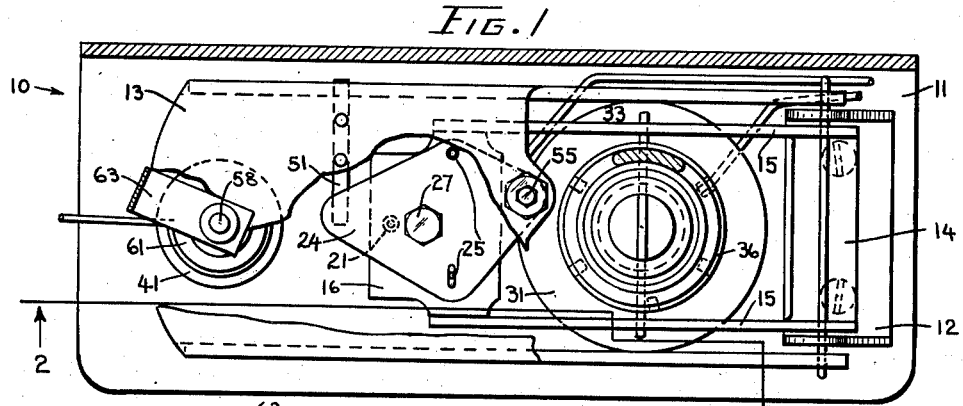
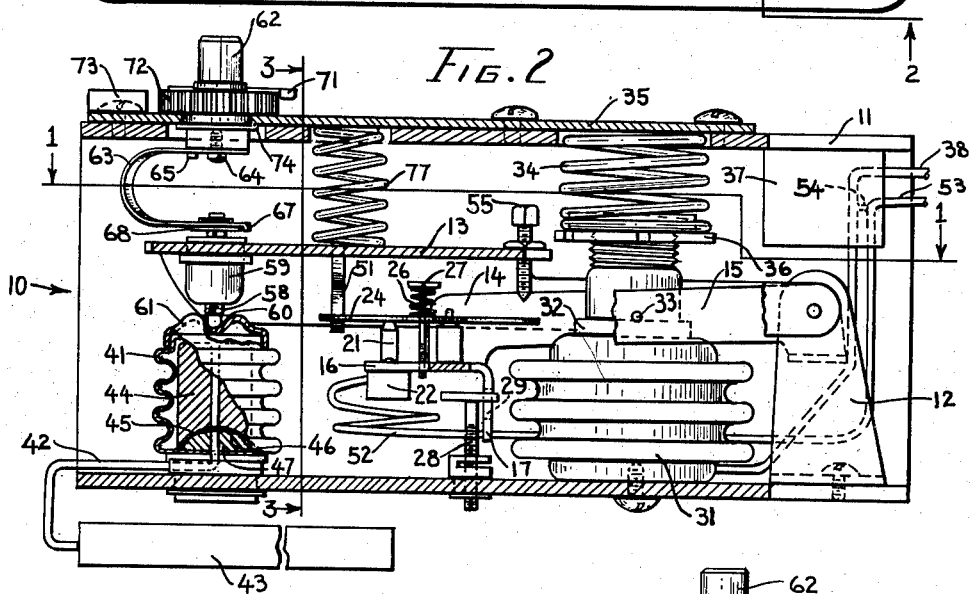
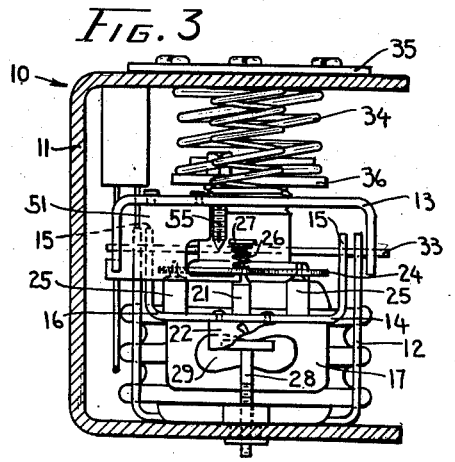
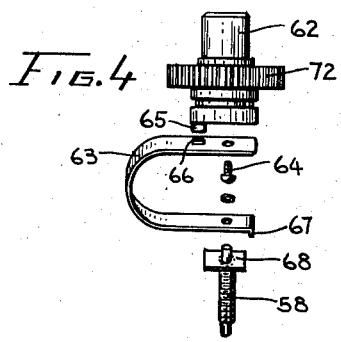
INVENTOR.
DAVID H. ELLIS
BY
George H Fisher
ATTORNEY June 24, 1952 D. H. ELLIS 2,601,377
REVERSIBLE THERMOSTATIC CONTROL DEVICE
Filed Oct. 13, 1948 2 SHEETS—SHEET 2
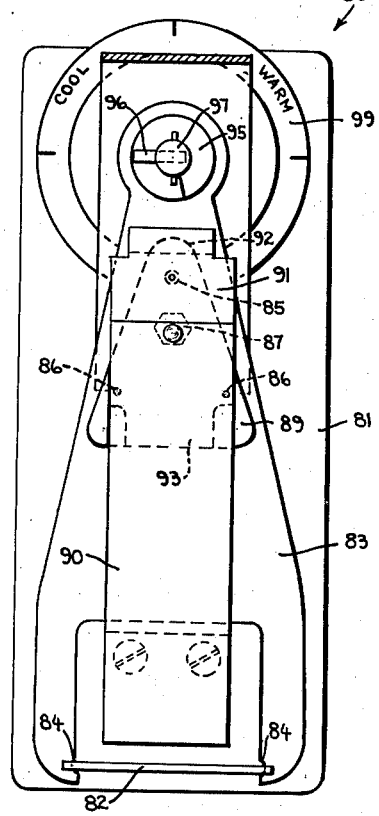
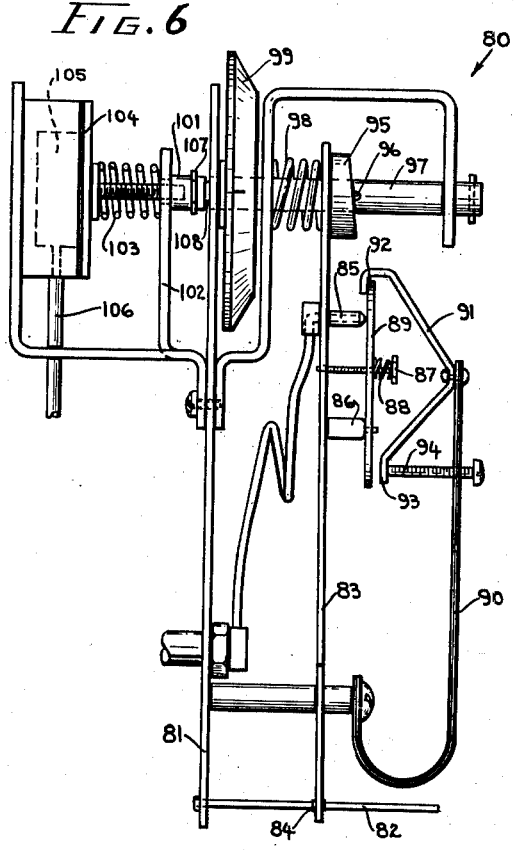
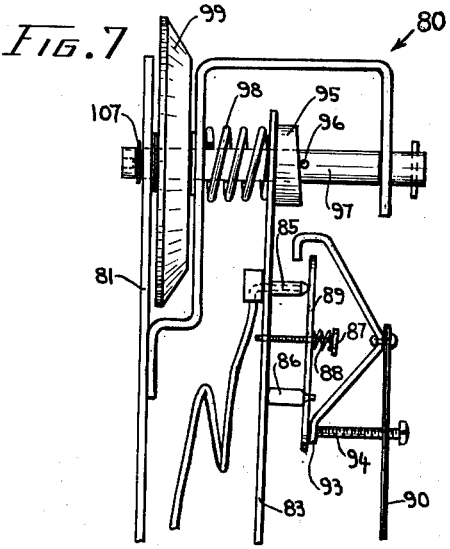
INVENTOR.
DAVID H. ELLIS
BY
George H Fisher
ATTORNEY Patented June 24, 1952

2,601,377

UNITED STATES PATENT OFFICE 2,601,377

REVERSIBLE THERMOSTATIC CONTROL DEVICE

David H. Ellis, Oak Park, Ill., assignor to Minneapolis-Honeywell Regulator Company, Minneapolis, Minn., a corporation of Delaware Application October 13, 1948, Serial No. 54,318

14 Claims. (Cl. 236—1)

The present invention relates to a pneumatic thermostat selectively operable in a direct or reverse sense by varying the main supply pressure.

When both heating and cooling is provided by air conditioning apparatus, it is necessary to use separate thermostats for the heating and cooling cycles of operation or to provide a single thermostat reversible in its controlling sequence. The reversing of sequence of a thermostat has important advantages over using two thermostats for such control but these advantages may disappear if the reversible thermostat be made too complicated. It is therefore a major object of this invention to provide an improved, simple and effective reversible pneumatic thermostat.

It is a further object to provide a reversible thermostat wherein the control point for either sequence may be readily adjusted by a single knob and wherein the overlap or separation of the control points or throttling ranges is adjustable.

It is an additional object to provide a pneumatic thermostat having a pivoted valve plate wherein the sequence of operation depends upon which side of the pivots the operating force of the thermostatic element is applied to the plate.

It is another object to provide a reversible thermostat having a control device mounted on a movable member wherein the operating sequence may be reversed by shifting said member.

It is a further object to provide a pneumatic thermostat having a thermally operable member arranged to operate a valve plate in opposite directions depending upon the relative spacings between the member and the plate.

It is also an object to provide a proportioning type pneumatic thermostat wherein the valve operating member is moved by a liquid filled bulb-bellows system and wherein the thermostat valve mechanism is shifted by a variation in air supply pressure.

It is an additional object to provide a liquid filled bulb-bellows system wherein the percentage of liquid in the bellows portion of the system is minimized by a pivoted plug in said bellows.

It is a further object to provide a control device having an actuating bellows, a member movable thereby, a threaded spacing member between the bellows and the member and an adjusting means including a flexible connection for the threaded member.

It is another object to provide a pneumatic control device which, with a minimum of change, may be made direct or reverse acting, and in which the change may be made manually or by a change in supply pressure. These and other objects will become apparent upon a study of the following specification and drawings wherein:

Figure 1 is a horizontal section, with parts broken away, taken on the line 1—1 of Figure 2, Figure 2 is a vertical section taken on the line 2—2 of Figure 1, Figure 3 is a cross section taken on the line 3—3 of Figure 2, Figure 4 is an exploded view of a portion of the adjusting mechanism, Figure 5 is a front elevation view of a modification of the apparatus of Figures 1–4, Figure 6 is a side elevation of the modification of Figure 5, Figure 7 is a partial side elevation of a modification of Figure 6, The thermostat 10 of Figures 1 to 3 is especially designed for use in unit air conditioners and therefore has no decorative cover, while the modification of Figures 5, 6 and 7 may be used in such a unit or may be provided with an ornamental cover, not shown, and used as a room thermostat. Obviously, thermostat 10 may be provided with an ornamental cover and may use a unitary thermal element, if desired.

Thermostat 10 comprises a channel-like base member 11 having a hinge bracket 12 on which is pivotally mounted an operating lever member 13 and a switching lever 14. Switching lever 14 includes a pair of leg members 15 connected by a platform portion 16 and a depending stop or limit flange 17. Nozzle 21 extends above portion 16 from a nozzle block 22 suitably attached to the under side of 16.

Valve plate 24 is also mounted on portion 16 by pivot pins 25 and is urged against nozzle 21 by spring 26 reacting against a threaded adjusting screw 27. Valve or nozzle plate 24 is sufficiently elongated to extend an appreciable distance beyond nozzle 21 at one end and beyond pivots 25 at the other end.

Pivotal movement of switching lever 14 and platform 16 is limited by the head of a limit screw 28 engaging either the upper or lower surface defining opening 29 in the depending stop flange 17, as shown in Figures 2 and 3.

Member 14 is urged upwardly by bellows 31 engaging a hinge pad 32 connected to legs 15 of member 14 by a hinge pin 33. A spring 34 working between a top plate member 35 and an adjustable nut 36 on hinge pad 32 opposes bellows 31 and is of such force that it will hold switching lever 14 in its lower position with the upper edge of opening 29 engaging the head of limit screw 28 when the pressure in bellows 31 is 13 lbs. per square inch, for instance. When the pressure in bellows 31 is increased to 17 lbs. per square inch, for instance, switching lever 14 is moved against spring 34 to its upper position, wherein the lower edge of opening 29 engages the head of limit screw 28. Pressure is applied to bellows 31 through tube 36 connected to a terminal block 37 which in turn is connected by tube 38 to an air supply main, not shown. The pressure in the air supply main may be changed by selectively using either a 13 lb. or a 17 lb. pressure reducing valve, or by any other suitable means, not shown.

Nozzle plate 24 is actuated by operating lever 13 which in turn is operated by bellows 41 connected by a capillary tube 42 to a temperature sensing bulb 43, the bellows-bulb system being filled with an expansible liquid such as a mixture of water and ethylene glycol. To minimize the volume of liquid in bellows 41, it is customary to provide a plug to occupy a substantial portion of the inner volume of the bellows. Instead of making this plug a fixed member, as usual, I have found that it may be made somewhat larger in diameter and more effective if it be movably mounted near its lower end so that it may shift to accommodate slight bending, misalignment or the like of the bellows. Therefore, plug member 44 has a lower concave surface 45 mating with a convex surface 46 of the lower plug portion 47. With this arrangement, any normal misalignment of the bellows is accommodated by a slight shifting of the upper member 44 and thus binding of bellows 41 against the plug is prevented.

A hook-like lower contact member 51 is attached to member 13 and arranged to engage the under surface of the left end, Figure 2, of nozzle plate 24 when bellows 41 expands and rotates lever member 13 clockwise, thus tending to lift plate 24 off nozzle 21 and permitting an escape of air from said nozzle, switching lever 14 being in its lower working position, as shown. Nozzle 21 is connected by tube 52 to terminal block 37 and to branch line 53, the nozzle 21 and branch line 53 being supplied air from the main conduit 38 through a restriction 54, so that, upon permitting air to escape from nozzle 21, the pressure at the nozzle and in branch 53 is diminished. An adjustable threaded member 55 is screwed through lever 13 and is arranged to engage the upper surface of the other end of member 24 upon a contraction of bellows 41 when switching lever 14 is in its upper working position, as will be more fully described in an operation paragraph. Operating lever 13 is connected to bellows 41 by a thrust pin 58 threaded through a nut member 59 attached to 13, the lower end of member 58 engaging a socket 60 in a cap member 61 fitted on the upper end of bellows 41. Threaded member 58 is rotated by an adjusting member 62 connected by a U-shaped flat strap 63 of spring material, member 62 being rotatable by a suitable knob, not shown, attached or connected thereto.

As best shown in Figures 2 and 4, strap 63 is connected to member 62 by a screw 64 and is prevented from rotating relative to member 62 by a lug 65 projecting into a slotted opening 66 in the upper portion of 63. The other end of member 63 is provided with a down-turned flange 67 which cooperates with a square head 68 on member 58 to prevent relative rotation, member 63 being held on head 68 by riveting the upper end of member 58, as shown in Figure 2. Obviously, any other suitable attachment, such as soldering, may be used. Strap 63 provides a positive flexible drive between member 62 and member 58, and the rotation of member 58 by member 62 varies the distance between bellows 41 and lever 13 to thus vary the control point of the instrument. The amount of permissible rotation of member 62 is limited by a stop member 71 coacting with notches 72 in member 62 to prevent rotation between member 71 and 72. Member 71 engages one or the other of flanges 73, only one being shown, on plate 35 upon reaching the end of its permissible travel. For convenience in assembling, member 62 is pivotally mounted in plate 35 and is held in place by a snap ring 74.

In operation, assuming that there is 13 lbs. air pressure in tube 38, and thus in bellows 31, switching lever 14 is in its lower-most position, as previously described. Assuming that member 62 is adjusted as desired, then an increase in temperature at bulb 43 causes an expansion of the fluid contained therein which results in an expansion of bellows 41 and a clockwise movement of member 13. This causes member 51 to engage the outer under side of plate 24 and lift it from nozzle 21, thereby permitting an escape of air and reducing the pressure in branch line 53, as previously described. As is well known in this art, a slight movement of plate 24 relative to nozzle 21 permits a limited escape of air so that the resulting branch line pressure is somewhere between 13 lbs. pressure and a minimum pressure of 2 lbs. per square inch, for instance. A further temperature increase at bulb 43, causing an additional expansion of bellows 41, will cause a further lifting of plate 24 from nozzle 21 and an increased escape of air, thereby further reducing the branch line pressure. Likewise, upon a cooling of bulb 43, the contraction of the liquid therein permits spring 77, strap 63, gravity, atmospheric pressure and possibly other forces to cause a contraction of bellows 41 and thus lower member 51 and permit spring 26 to push plate 24 towards nozzle 21, thereby restricting the flow of air from the nozzle and causing an increase in branch pressure. Upon nozzle 21 being closed by plate 24, the branch line pressure will build up to the 13 lb. pressure per square inch in tube 38.

With this arrangement, because an increase in temperature at bulb 43 causes a decrease in branch line pressure, the branch line may be connected to a normally open valve which controls the temperature changing medium. Thus, the reduction in pressure permits a wider opening of the valve and an increased flow of the temperature changing medium, this being a proper sequence for summer cooling.

Upon changing the supply of main pressure to 17 lbs. per square inch, bellows 31 is expanded against spring 34 and switching lever 14 is urged upwardly until the lower surface of opening 29 engages the head of limit screw 28 thereby limiting this movement. The upward movement of the nozzle carrying platform 16 tends to move nozzle plate 24 out of engagement with member 51 and brings it in close proximity to screw 55.

Upon a reduction in temperature at bulb 43, a contraction of the expansible liquid therein causes a similar contraction of bellows 41, thereby permitting spring 77 and other forces to move member 13 counterclockwise so that screw 55 engages the right end, Figure 2, of plate 24 and prys plate 24 away from nozzle 21, to thereby reduce branch line pressure. Reducing the branch line pressure, as previously described, causes an opening of a normally open valve controlled thereby and thereby makes this sequence a proper one for controlling the flow of a heating medium, for such flow is increased as the temperature of sensing bulb 43 decreases. Obviously, an increase in temperature at bulb 43 will cause an expansion of bellows 41 and a movement of screw 55 away from plate 24, to thereby permit spring 26 to close plate 24 against nozzle 21 and reestablish full branch line pressure. By properly adjusting screw 55, the control point for the heating sequence may be exactly the same as that for the cooling sequence, assuming that knob 62 is not adjusted, and this is the preferred arrangement because only one set of calibrations is then needed on the adjusting knob. However, if desired, screw 55 may be adjusted so that the control point for the heating sequence will be a predetermined amount under the control point for the cooling sequence.

A simplified version of thermostat 10 is illustrated by thermostat 80 in Figures 5, 6 and 7, this device including a base 81 to which is rigidly attached a bracket 82. Switching lever 83 is pivotally connected at 84 to bracket 82 and has mounted thereon a nozzle 85, nozzle pivots 86 and a screw member 87 which carries a spring 88 for urging valve plate 89, mounted on pivots 86, against nozzle 85.

Valve plate 89 is operated by a bimetal 90 having one end rigidly attached to base 81 and carrying a modified V-shaped member 91 at its other end. One branch of V-member 91, the upper one, has a hook portion 92 for engaging the under side of one end of valve plate 89 while the other branch of member 91 has a flange 93 for engaging the remote end of valve plate 89, this end of valve plate 89 being on the opposite side of pivots 86. An adjustable screw member 94 is provided for varying the attitude of member 91 relative to bimetal 90 to thereby vary, to some extent, the control point of the instrument and the difference between the control points on heating and cooling sequence. Generally, this will be a factory calibration and may, as before, be so adjusted that the control points for both heating and cooling sequence will be the same.

To vary both the control point and the sequence of thermostat 80, the upper end of switching lever 83 is provided with a cam faced member 95 engaging a pin 96 in an adjusting rod 97 which is both rotatable and longitudinally movable. Cam member 95 is held firmly against pin 96 by a spring 98 and, assuming that there is no longitudinal movement of shaft 97, rotation of said shaft by either an adjusting dial 99, slidably splined on said shaft 97, or by a remote handle, not shown, causes movement of switching lever 83 relative to bimetal 90 due to movement of pin 96 on the face of cam member 95. Obviously, this will then require a different temperature at bimetal 90 to cause operation of valve plate 89 then was required before this adjustment was made. In the above description, shaft 97 is assumed to be fixed longitudinally and this results from end 101 of 97 engaging bracket member 102 due to the force of spring 103, spring 103 being of sufficient force to overcome spring 98 and 13 lbs. air pressure behind flexible diaphragm 104, diaphragm 104 covering chamber 105 which is connected by tube 106 to the air supply main, chamber 105 and diaphragm 104 then constituting a pneumatic motor.

An increase in air supply pressure to 17 lbs. per square inch is sufficient to assist spring 98 in overcoming spring 103 and shifting shaft 97 to the right until snap ring 107 engages base 81 and thereby limits this movement. Obviously, the shifting of shaft 97 to the right permits a corresponding shift of the upper end of switch lever 83 and thereby repositions nozzle 87 and nozzle plate 89 so that flange 93 will be in active control of the position of nozzle plate 89 upon changes in temperature at bimetal 90. Thus, an increase in temperature of bimetal 90 causing it to move to the left will cause flange 93 to engage plate 89 in a direction to pry said plate away from nozzle 85 and thereby reduce branch line pressure. Likewise, movement of bimetal 90 to the right will move 93 away from the nozzle plate and permit spring 88 to force said plate against the nozzle and thus restore branch line pressure. This sequence is just the reverse of that resulting from temperature changes of bimetal 90 with switching lever 83 positioned as shown in Figure 6 wherein a movement to the left of bimetal 90 causes an increase in branch line pressure and a movement to the right causes a decrease in said pressure.

If desired, the change in sequence may be made manually as either a factory or a field adjustment by leaving off the diaphragm assembly 104 and spring 103 and permitting spring 98 to shift shaft 97 to the right until snap ring 107 engages base 81, as shown in Figure 7, or the opposite sequence may be obtained by moving snap ring 107 into notch 108 to thereby hold shaft 97 in the position shown in Figure 6.

The operation of this modification is, as is obvious from the above description, the same as that of the previous embodiment with the change in sequence being a result of shifting switching lever 83 which positions the nozzle and its cooperating nozzle plate in one position or another so that the thermally operated member 91 may engage one end or the other of nozzle plate 89 to either lift it from nozzle 85 or to pry it from said nozzle. This modification differs slightly from the previous example by its adjustment of control points, which adjustment is made by further adjusting the position of lever 83 by rotation of shaft 97. Also, the thermally active element is fixed whereas the previous embodiment involved an adjustable connection between the operating lever and the temperature responsive device. Although no restriction is shown between the air supply main and the branch line and nozzle 85, it is obvious that these air connections may be made in the same manner as in the previous embodiment, or as is somewhat conventional, the restriction may be away from thermostat 80, with only one air line going to nozzle 85 and another, if desired, going to switching chamber 105.

Other substitutions and modifications of the above described apparatus will be readily apparent upon a study of the present specification and drawings, hence the scope of this invention should be determined only by the appended claims.

I claim as my invention:

1. In a pneumatic thermostat, a nozzle, a pivoted valve plate member arranged to open and close said nozzle, a pivoted switching lever on which said nozzle and pivots for said plate member are mounted, a thermostatic device, a pivoted lever operable by said device, said lever having spaced valve plate member engaging portions, one of said portions being arranged to engage the upper side of said member on one side of the pivots for said member and the other of said portions being arranged to engage the under side of said member on the opposite side of said pivots, pneumatic motor means connected to move said switching lever in one direction, spring means for moving said switching lever in an opposite direction, stop means for limiting the motion of said switching lever, and adjusting means for said thermostatic device.

2. In a pneumatic control device, a nozzle, a pivoted plate member arranged to control the opening of said nozzle, a pivoted switching lever on which said nozzle and the pivot means for said plate member are mounted, stop means coacting with said switching lever, means for shifting said switching lever from one position to another position, said positions being determined by said stop means, a movable member having spaced valve plate engaging portions, one of said portions being arranged to engage the upper side of said plate member on one side of said pivot means and the other one of said spaced portions being engagable with the under side of said plate member on the other side of said pivot means, and condition responsive means for moving said movable member.

3. A thermostat comprising an element movable in response to temperature changes, a valve means including a member pivoted intermediate its ends, a connecting means between said element and said member arranged to push on one end of said member when said element moves in one direction and to pull on the other end of said member when said element moves in the other direction, said connecting means being arranged to permit a predetermined movement of said element without causing movement of said member, stop means, and means for shifting said valve means by an amount approximately corresponding to said predetermined movement for changing the sequence of operation of said thermostat, said stop means positively limiting said shifting movement.

4. A pneumatic thermostat including a control valve means, said valve means including a pivoted operating member having end portions on opposite sides of pivot means for said member, a base member, a platform member hingedly mounted on said base member and on which said valve means is mounted, a bimetal member attached to said base member, a connecting member attached to said bimetal member and having spaced operating member engaging portions, one of said portions being arranged to engage only a bottom side of one end of said operating member and the other portion being arranged to engage only an upper portion of the other end of said operating member, and means for adjusting the position of said platform member relative to said bimetal member.

5. A pneumatic thermostat including a control valve means, said valve means including a pivoted operating member having end portions on opposite sides of the pivot means for said member, a base member, a platform member hingedly attached to said base member and on which said valve means is mounted, a thermostatically operable member attached to said base member, a connecting member attached to said thermostatically operable member and having spaced operating member engaging portions, one of said portions being arranged to pull only on one end of said operating member and the other portion being arranged to push only on the other end of said operating member, and means for shifting said platform member relative to said connecting member.

6. A pneumatic thermostat including a control valve means, said valve means including a pivoted operating member having end portions on opposite sides of the pivot means for said member, a base member, a platform member hingedly attached to said base member and on which said valve means is mounted, a thermostatically operable member attached to said base member, a connecting member attached to said thermostatically operable member and having spaced operating member engaging portions, one of said portions being arranged to pull only on one end of said operating member and the other portion being arranged to push only on the other end of said operating member, and means for shifting said platform member relative to said connecting member, said shifting means comprising expansible means for forcing the said platform member in one direction and spring means for opposing said expansible means.

7. A pneumatic thermostat including a control valve means, said valve means including a pivoted operating member having end portions on opposite sides of the pivot means for said member, a base member, a platform member hingedly attached to said base member and on which said valve means is pivotally mounted, a thermostatically operable member attached to said base member, a connecting member attached to said thermostatically operable member and having spaced operating member engaging portions, one of said portions being arranged to pull only on one end of said operating member and the other portion being arranged to push only on the other end of said operating member, and motor means for shifting said platform member a predetermined amount, said amount being sufficient to make either one or the other of said connecting portions normally operable to move said operating member.

8. A pneumatic control device comprising an element movable in response to a condition indicative of a need for operation of said device, a nozzle, a nozzle plate having end portions, pivot means for said nozzle plate intermediate said end portions, connecting means arranged between said element and said plate, said connecting means being arranged to push only against an end portion of said plate on one side of said pivot means and to pull only on an opposite end portion of said plate, manually adjustable means for adjusting said nozzle and nozzle plate by relatively small increments, and pneumatic motor means for shifting said nozzle and nozzle plate by a relatively large and predetermined amount for changing the sequence of control of said device, said motor means simultaneously shifting at least a portion of said manually adjustable means to effect said change in sequence, said manually adjustable means being effective to adjust said nozzle and plate regardless of the sequence being used.

9. In a control device, a base, a switching lever pivotally mounted on said base, a nozzle mounted on said lever, an elongated nozzle plate pivotally attached intermediate its opposite ends to said lever, a spring for urging said plate against said nozzle, a spring opposed bellows for positioning said switching lever, stop means for limiting the movement from said lever, a second lever pivotally mounted on said base, an expansible member attached to said base member, a threaded connection between said expansible member and said second lever, adjusting means rotatably mounted in said base, a U-shaped flexible strap member connecting said adjusting means and said threaded means, and valve plate operating means attached to said second lever.

10. In a control device, a base, a switching lever pivotally mounted on said base, a nozzle mounted on said lever, an elongated nozzle plate pivotally attached intermediate its ends to said lever, a spring for urging said plate against said nozzle, a spring opposed bellows for positioning said switching lever, stop means for limiting the movement of said lever, a second lever pivoted to said base, an expansible member attached to said base, adjustable connection means between said expansible member and said second lever, means attached to said second lever for pressing against one end of said nozzle plate, and hook means attached to said second lever and arranged to lift up the opposite end of said valve plate.

11. In a control device, a base, a switching lever pivotally attached to said base, valve means attached to said lever, said valve means including a pivoted operating lever having remote ends on the opposite sides of its pivot means, means for shifting said lever to one of two positions, a second lever pivotally related to said base, spaced means carried by said second lever for sequentially engaging the opposite ends of said valve operating lever, a bellows attached to said base, a threaded connection between said bellows and said second lever for varying the working position of said bellows, a pivoted plug in said bellows, and a bulb connected to said bellows, said bellows and bulb being filled with an expansible liquid.

12. In a thermostat, a base, a bellows attached to said base, a pair of relatively movable control elements at least one of which is operable by said bellows, means for varying the distance between said bellows and said control element, a pivoted plug in said bellows, said plug having a height reaching to substantially the lowest working position of said bellows and having a diameter only slightly less than that across the inner convolutions of the bellows, a bulb attached to said bellows, said bulb and bellows being filled with an expansible liquid, and apparatus in addition to said bellows and adjusting means for moving both of said control elements.

13. In a control device, a base, an expansible member attached to said base, a control element operable by said member, rotatable means for varying the operative relation between said member and said element, an adjusting knob attached to said base, and a U-shaped strap member having one end attached to said knob and having its other end attached to said rotatable means for constituting a positive flexible drive between said knob and said rotatable means.

14. In a control device, a bellows having a base portion, a pair of relatively movable control elements operable by said bellows, means for varying the working relation between said bellows and said control elements, a cylindrical plug in said bellows of a diameter slightly smaller than the minimum inside diameter of said bellows, mating convex-concave surfaces between said plug and the base portion of said bellows for permitting pivotal movement of said plug and tending to center said plug in said bellows, and a bulb attached to said bellows, said bellows and bulb being filled with an expansible fluid.

DAVID H. ELLIS.

REFERENCES CITED

The following references are of record in the file of this patent:

UNITED STATES PATENTS

| Number | Name | Date |
| --- | --- | --- |
| 1,798,192 | Clifford | Mar. 31, 1931 |
| 2,064,175 | Otto | Dec. 15, 1936 |
| 2,120,507 | Otto | June 14, 1938 |
| 2,285,513 | Harris | June 9, 1942 |
| 2,312,671 | Otto | Mar. 2, 1943 |
| 2,395,007 | Leupold | Feb. 19, 1946 |